United States Patent
Citro

(10) Patent No.: US 6,808,081 B1
(45) Date of Patent: Oct. 26, 2004

(54) REFUSE OR RECYCLING PAIL

(76) Inventor: Angelo Citro, 241 E. Gainsborg Ave., West Harrison, NY (US) 10604

( * ) Notice: Subject to any disclaimer, the term of this patent is extended or adjusted under 35 U.S.C. 154(b) by 37 days.

(21) Appl. No.: 10/379,839

(22) Filed: Mar. 5, 2003

(51) Int. Cl.[7] .............................................. B65D 25/28
(52) U.S. Cl. ...................... 220/772; 40/310; 116/63 P; 220/755; 220/908; 206/459.5; 404/6; 404/14
(58) Field of Search ................................ 220/755, 772, 220/908, 908.1, 908.2, 908.3, 909; 116/63 P, 63 C, 63 R; 40/306, 612; 404/6, 14

(56) References Cited

U.S. PATENT DOCUMENTS

| | | | |
|---|---|---|---|
| 3,876,223 A | | 4/1975 | O'Reilly et al. |
| 3,952,690 A | * | 4/1976 | Rizzo et al. ............... 116/63 P |
| 4,083,033 A | * | 4/1978 | Kulp et al. .................. 340/908 |
| 4,674,431 A | * | 6/1987 | Cory ......................... 116/63 P |
| 5,165,564 A | | 11/1992 | Prout et al. |
| 5,215,423 A | * | 6/1993 | Schulte-Hinsken et al. . 414/408 |
| 5,261,562 A | | 11/1993 | Prout et al. |
| 5,323,923 A | | 6/1994 | Schauer |
| 5,390,818 A | | 2/1995 | LaBuda |
| 5,547,104 A | | 8/1996 | Parker |
| 5,582,322 A | | 12/1996 | Prout et al. |
| 5,860,386 A | * | 1/1999 | Schwab et al. ............ 116/63 P |
| 5,967,362 A | | 10/1999 | Corbin |
| 6,182,856 B1 | | 2/2001 | Berrenberg et al. |
| 6,471,221 B1 | | 10/2002 | McGarry |

* cited by examiner

*Primary Examiner*—Joseph C. Merek
(74) *Attorney, Agent, or Firm*—Michael I Kroll

(57) ABSTRACT

The present invention 10 discloses a refuse and recycling container 12 for cans, bottles or paper that includes a light weight container body 12 with integrally formed bottom 14 and side wall 16 wherein the upper end of the side wall around the periphery thereof defines a mouth 18 for receiving refuse or recycling items and for receiving and supporting a lid 20 having an open grip handle 27. Also shown are a plurality of base 24 and upper 26 disposed handles for easy manipulation of the pail 12. The recycling container also has base apertures 34 for drainage and a reflective element 28 encompassing a portion of the outer periphery that provides address identification blocks 30 for owner identification. In addition, there are interior indicia 32 and indicia lines 38 used to guide the user in the proper use of the recycling container.

8 Claims, 10 Drawing Sheets

REFUSE OR RECYCLING PAIL

BACKGROUND OF THE INVENTION

1. Field of the Invention

The present invention relates generally to refuse and recycling containers and, more specifically, to a refuse or recycling pail for cans, bottles or paper that includes a light weight body with integrally formed bottom and side wall, the upper end of the side wall around the periphery thereof defining a mouth for receiving refuse or recycling items and for receiving and supporting a lid having an open grip handle. Also having a plurality of base and upper disposed handles for easy manipulation of the pail. The recycling container also has base apertures for drainage and a reflective element encompassing a portion of the outer periphery that provides address identification blocks for owner identification. In addition, there are interior indicia used to guide the user in the proper use of the recycling container. It is not always obvious to everyone that a recycling container does not mean fill it up with whatever fits. A pail of this size full of newspapers could weigh 150 to 200 pounds, making it impossible for anyone to pick it up to dump the contents. Or, that weighting the bottom with newspapers and putting bottles and cans on the top makes it impossible to remove the bottles and cans other than one at a time without dumping the paper in the bottles and can portion of the pickup vehicle or that the pail of the present invention should be used either for refuse or recycling items and not in conjunction with one another. Therefore, a need exists to convey to the user of the recycling container guidelines for recycling material that will aid in the collection of the materials.

2. Description of the Prior Art

There are other refuse container devices designed for disposal of refuse. Typical of these is U.S. Pat. No. 3,876,223 issued to O'Reilly et al., on Apr. 8, 1975.

Another patent was issued to Prout, et al., on Nov. 24, 1992 as U.S. Pat. No. 5,165,564. Yet another U.S. Pat. No. 5,261,562 was issued to Prout, et al. on Nov. 16, 1993 and still yet another was issued on Jun. 28, 1994 to Schauer as U.S. Pat. No. 5,323,923.

Another patent was issued to LaBuda on Feb. 21, 1995 as U.S. Pat. No. 5,390,818. Yet another U.S. Pat. No. 5,547,104 was issued to Parker on Aug. 20, 1996. Another was issued to Prout, et al., on Dec. 10, 1996 as U.S. Pat. No. 5,582,322 and still yet another was issued on Oct. 19, 1999 to Corbin as U.S. Pat. No. 5,967,362.

Another patent was issued to Berrenberg, et al., on Feb. 6, 2001 as U.S. Pat. No. 6,182,856. Yet another U.S. Pat. No. 6,471,221 was issued to McGarry on Oct. 29, 2002.

A cart adapted for the storage and transportation of a multiplicity of items of baseball equipment such as baseball bats, baseballs, catcher's equipment, helmets and head gear, first aid kit, score book, resin bag and other assorted necessities the cart being of a box like rectangular hollow configuration provided with handles for ease of carrying and wheels for ease of rolling and with the entire front and top surface of the cart opening to provide complete access to the interior of the cart and with the top forming a writing table when open, the overall size of the cart being such as to be easily placed into a standard automobile trunk.

A lid for covering and enclosing the mouth of a refuse container, including a first lid panel wall for enclosing and covering the mouth of the container and a second lid panel wall integrally formed with the first lid panel wall around a perimeter of the first lid panel wall and closely spaced-apart from the first lid panel wall intermediate the perimeter of the first lid panel wall to form a double wall container lid. The lid is constructed of thermoplastic by blow-molding.

A refuse container characterized by durability and light weight. The refuse container includes a lightweight blow-molded body, including integrally-formed bottom wall and side walls, the upper end of the side walls around the periphery thereof defining a mouth for receiving refuse, and for receiving and supporting a lid. An integrally-formed blow-molded handle extends outwardly from a rear side of the container adjacent the upper end thereof. The handle includes first and second spaced-apart hollow handle supports formed adjacent the side edges of the rear side of the container and a hollow handlebar integrally-formed with and extending between the first and second handle supports.

An improved waste container is disclosed comprising a container body having a bottom and a sidewall defining an opening in the container body. The container body has a first and a second handle support for supporting a handle. A first and a second aperture is defined in the first and second handle supports. A container lid has a first and a second lid support with a first and a second pin extending therefrom. The first and second apertures receive the first and second pins for pivotally connecting the container lid to the container body. A barrier comprising the handle and the lid supports limits the pivotal movement of the container lid.

An apparatus for receiving and holding a flexible and collapsible trash liner comprises a rigid upright trash receptacle having a main body with a generally closed bottom and an open top. The bottom has a periphery about which the bottom is affixed to the main body, and this periphery has at least one cavity formed therealong. The cavity effectively forms a foothold for a user in removing the trash liner from the receptacle as well as a handhold for a user in transporting the trash receptacle.

A waste container having a container body to an upper portion of which is pivotally mounted a lid. A wheel and axle assembly is mounted to a lower portion of the container body to aid in the movement of the waste container. The waste container has an upper handle disposed near the upper portion of the container body and a lift handle disposed near the lower portion of the container body in opposing and vertically aligned relationship to the upper handle. The opposing relationship of the upper handle and the lift handle provides for a person to grasp the upper handle and the lift handle to lift and invert the waste container into a receiving vehicle to dump the contents of the waste container.

In a rotationally-molded thermoplastic refuse container of the type having a hollow handle integrally-molded with a refuse-carrying compartment of the container, the improvement which includes a wall integrally-formed with the refuse container and sealingly enclosing the hollow handle from communication with the refuse-carrying compartment of the container for providing greater strength to the container and preventing refuse from lodging in the hollow handles.

A new garbage can with lifting supports for reducing an amount of effort needed to lift and empty the garbage can. The inventive device includes a container having an open upper end, a closed lower e, and a side wall therebetween. The open upper end has a lid removably disposed thereover. A pair of lifting supports are coupled with respect to the container. An upper lifting support is disposed downwardly of the open upper end of the container. A lower lifting support is disposed upwardly of the closed lower end of the container.

A waste container is composed of synthetic resin material and is provided at the front wall with a recess bridged by a grip formed by front and rear portions. The rear wall portion has extensions defining the small sides of the grip space and merging with the back wall portion of the recess or with a wall parallel thereto and connected with the back wall portion.

A trash can system has a container. The container has a large upper periphery with a front and a rear. The container also has a small lower periphery with a front and a rear. Between the upper and lower peripheries, the container also has a side wall. The container also has a recess. The recess has a generally rectilinear configuration formed at the bottom of the side wall at the rear of the lower periphery. Within the recess is a lower tubular handle. The handle is in a horizontal orientation with a central extent of the handle being spaced from the container.

While these containers may be suitable for the purposes for which they were designed, they would not be as suitable for the purposes of the present invention, as hereinafter described. The present invention a refuse or recycling pail for cans, bottles or paper that includes a light weight body with integrally formed bottom and side wall, the upper end of the side wall around the periphery thereof defining a mouth for receiving refuse or recycling items and for receiving and supporting a lid. Also having a plurality of base and upper disposed handles for easy manipulation of the pail, base apertures for drainage, a reflective element encompassing a portion of the outer periphery that provides address identification blocks for owner identification and interiorly positioned indicia indicating sections for recyclables and a lid that provides an open grip handle.

The pail of the present invention should be used either for refuse or recycling items and not in conjunction with one another.

SUMMARY OF THE PRESENT INVENTION

The present invention discloses a refuse and recycling container for cans, bottles or paper that includes a light weight body with integrally formed bottom and side wall wherein the upper end of the side wall around the periphery thereof defines a mouth for receiving refuse or recycling items and for receiving and supporting a lid having an open grip handle. Also shown is a plurality of base and upper disposed handles for easy manipulation of the pail. The recycling container also has base apertures for drainage and a reflective element encompassing a portion of the outer periphery that provides address identification blocks for owner identification. In addition, there are interior indicia and indicia lines used to guide the user in the proper use of the recycling container.

A primary object of the present invention is to provide a refuse or recycling pail that stores refuse or recycling items such as cans, bottles or paper for collection.

Another object of the present invention is to provide a refuse or recycling pail that includes a light weight body with integrally formed bottom and side wall, the upper end of the side wall around the periphery thereof defining a mouth for receiving refuse or recycling items and for receiving and supporting a lid.

Yet another object of the present invention is to provide a refuse or recycling pail that provides a plurality of base and upper disposed handles for easy manipulation of the pail.

Still yet another object of the present invention is to provide a refuse or recycling pail that provides base apertures for drainage.

Another object of the present invention is to provide a refuse or recycling pail that provides a reflective element encompassing a portion of the outer periphery that provides address identification blocks for owner identification.

Yet another object of the present invention is to provide a refuse or recycling pail that provides interiorly positioned indicia indicating sections for recyclables.

Still yet another object of the present invention is to provide a refuse or recycling pail that provides a lid having a wide open grip handle.

Additional objects of the present invention will appear as the description proceeds.

The present invention overcomes the shortcomings of the prior art by providing a refuse or recycling pail for cans, bottles or paper that includes a light weight body with integrally formed bottom and side wall, the upper end of the side wall around the periphery thereof defining a mouth for receiving refuse or recycling items and for receiving and supporting a lid. Also having a plurality of base and upper disposed handles for easy manipulation of the pail, base apertures for drainage, a reflective element encompassing a portion of the outer periphery that provides address identification blocks for owner identification and interiorly positioned indicia indicating sections for recyclables and a lid that provides an open grip handle.

The pail of the present invention should be used either for refuse or recycling items and not in conjunction with one another.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
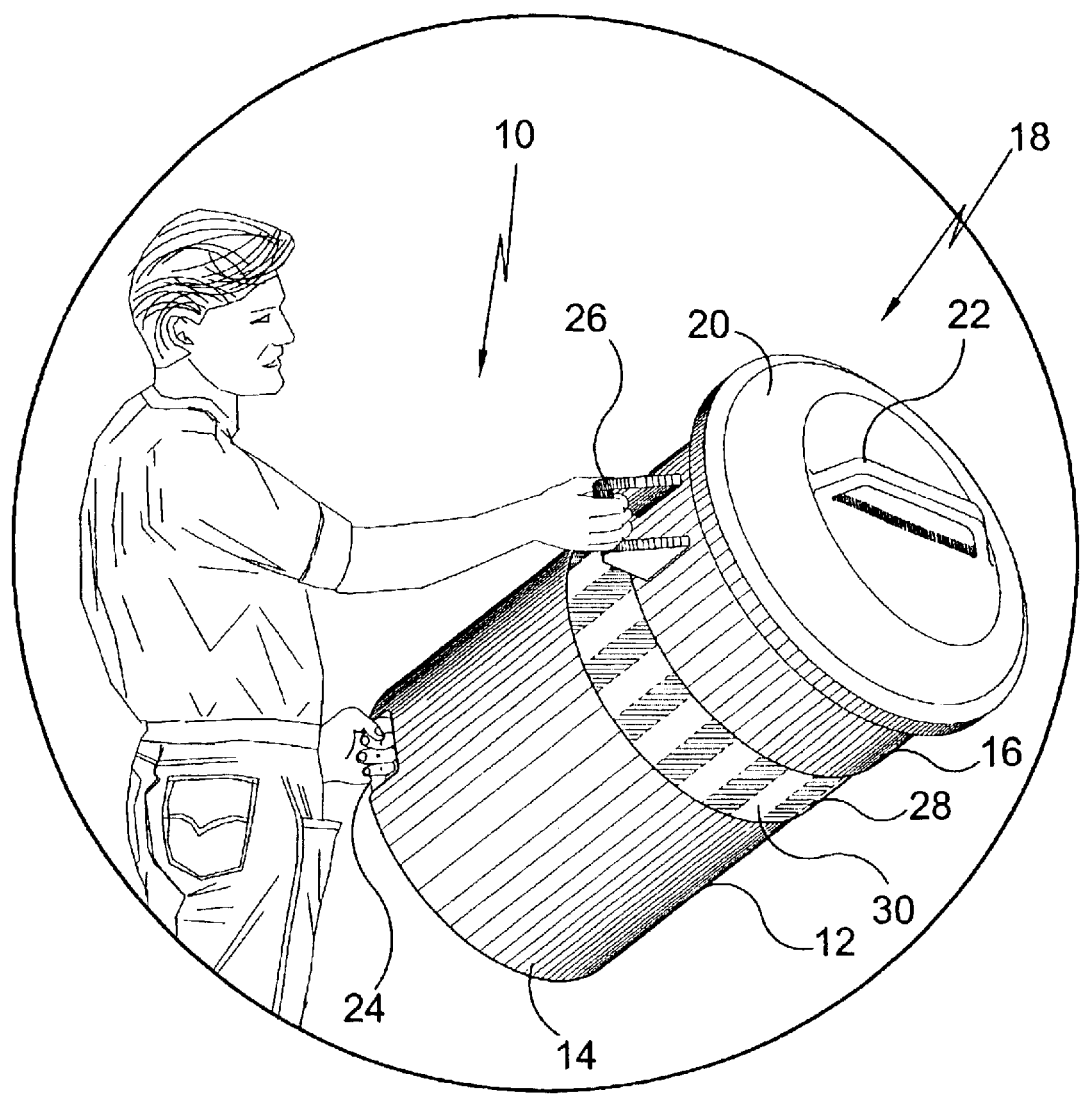
FIG. 1 is an illustrative view of the present invention in use.

With regard to reference numerals used, the following numbering is used throughout the drawings.

10 present invention
12 body
14 bottom
16 side wall
18 mouth
20 lid
22 lid handle
24 bottom handle
26 upper handle
28 reflective element
30 address blocks
32 interior indicia
34 apertures
36 handle housing
38 indicia lines

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10. The present invention 10 being a cylindrical refuse or recycling pail for cans, bottles or paper, includes a light weight body 12 with integrally formed bottom 14 and side wall 16, the upper end of the side wall around the periphery thereof defining a mouth 18 for receiving refuse or recycling items and for receiving and supporting a lid 20 with handle 22. Also shown are a plurality of base 24 and upper 26 disposed handles for easy manipulation of the pail 12, base apertures for drainage (not shown), a means for a reflective element 28 encompassing a portion of the outer periphery that also provides means for address identification blocks 30 for owner identification and interiorly positioned indicia (not shown) indicating sections for recyclables and a lid 20 that provides an open grip handle 22.

Figure 2:
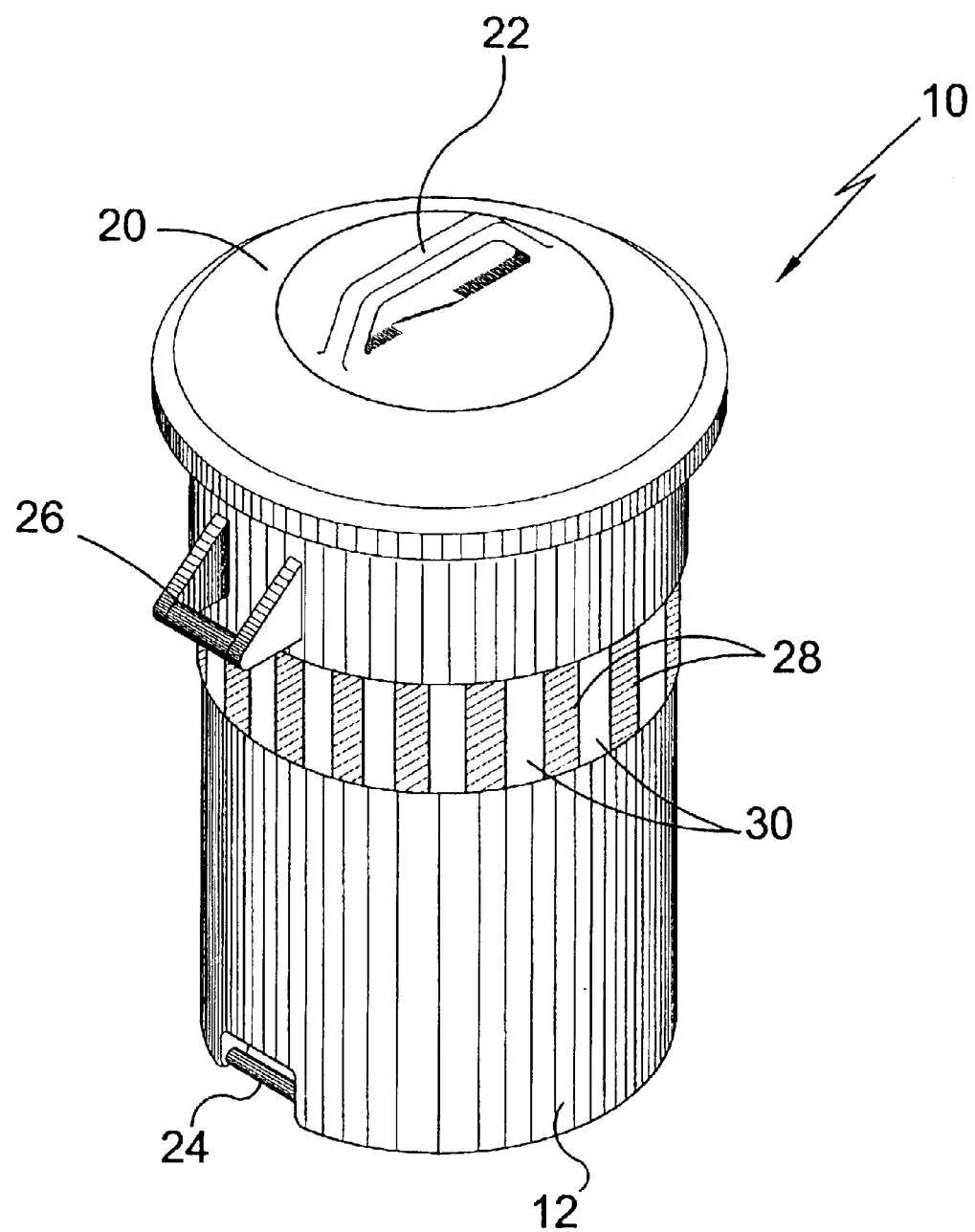
FIG. 2 is a perspective view of the present invention.

Turning to FIG. 2, shown therein is a perspective view of the present invention 10. Shown is the refuse pail, can or container 12 of the present invention 10 having large handles located at the top 26 and bottom 24 of the outer portions of the pail, providing a better grip, less exertion and easy control for the user when manipulating the pail and the pail lid 20 providing a large open grip handle 22, making opening and closing easy. The bottom portion of the pail 12 provides drainage, allowing water or fluid build up to drain out. A reflective element 28 encompassing a portion of the outer periphery that also provides address identification blocks 30 for owner identification. The reflective element 28 provides a safety precaution and allows the pail 12 to also be utilized as a barricade on a construction site.

Figure 3:
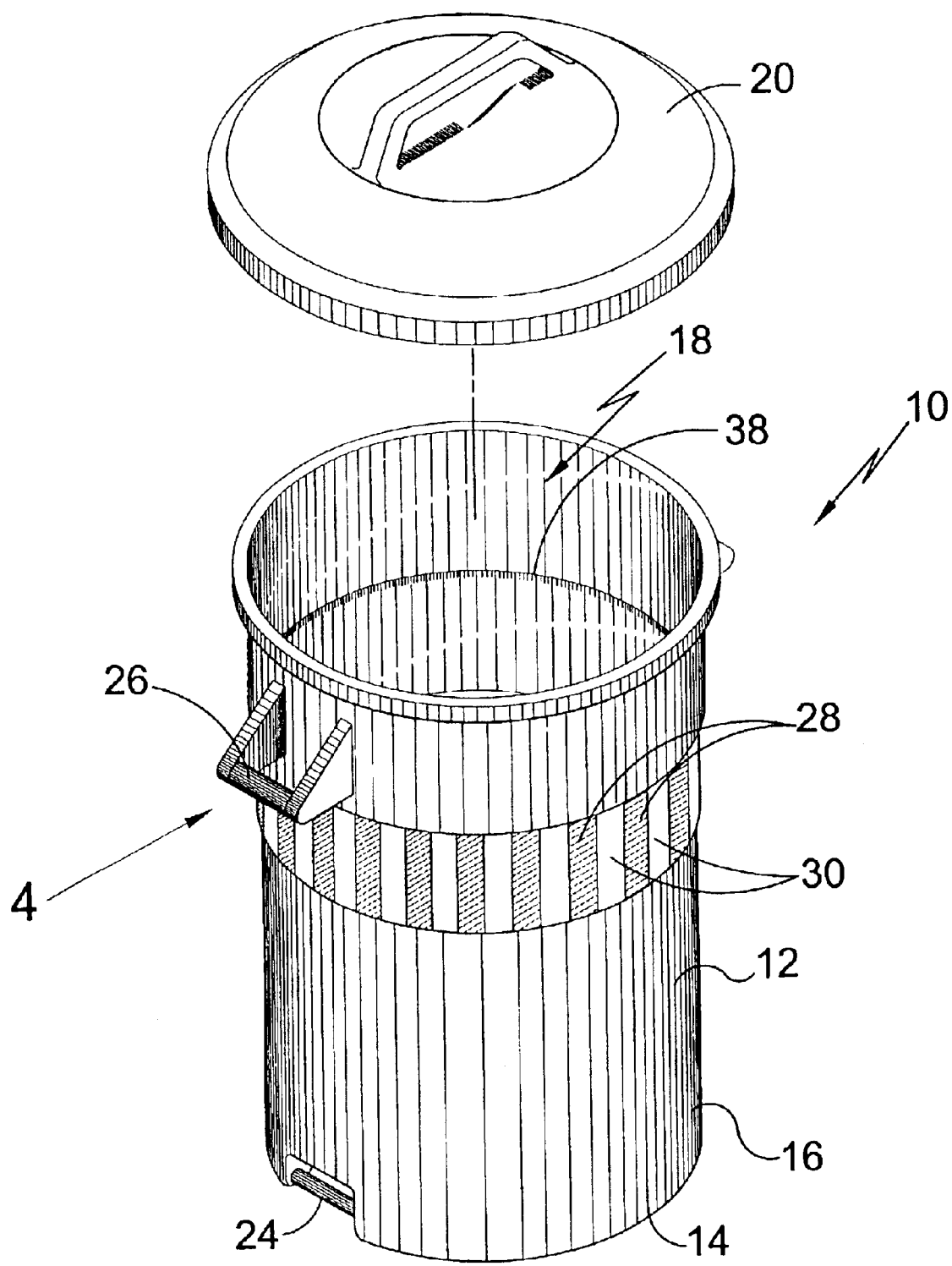
FIG. 3 is a perspective view of the present invention.

Turning to FIG. 3, shown therein is a perspective view of the present invention 10. Shown is the present invention 10, being a refuse or recycling pail for cans, bottles or paper, that includes a light weight body or pail 12 with an integrally formed bottom 14 and side wall 16 wherein the upper end of the side wall around the periphery thereof defines a mouth 18 for receiving refuse or recycling items and for receiving and supporting a lid 20. Also shown are a plurality of base 24 and upper 26 disposed handles for easy manipulation of the pail 12, base apertures for drainage (not shown), interiorly positioned indicia lines 38 indicating sections for recyclables and a reflective element 28 encompassing a portion of the outer periphery of the pail having address blocks 30 for owner identification.

Figure 4:
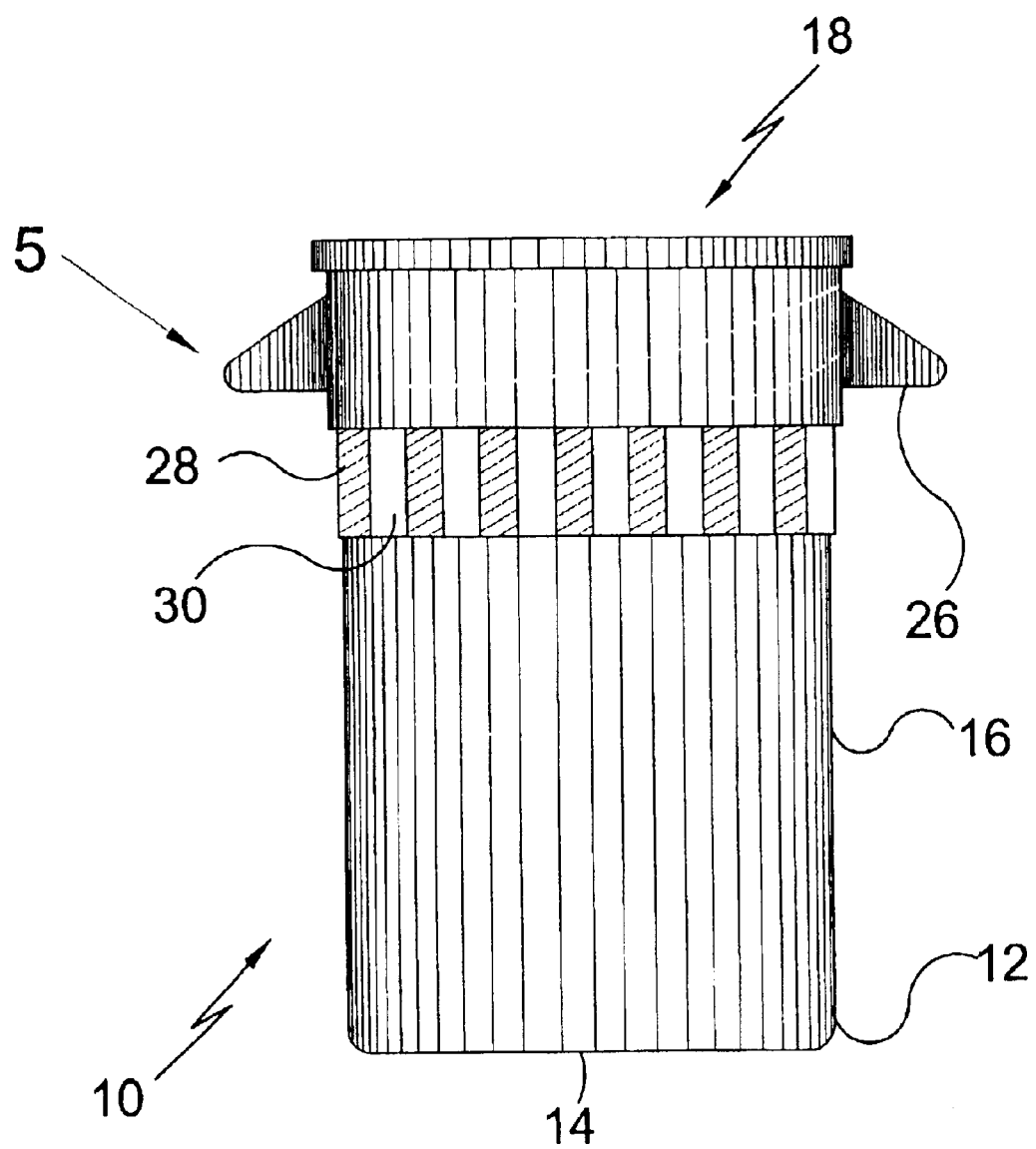
FIG. 4 is a side view of the present invention.

Turning to FIG. 4, shown therein is a side view of the present invention 10. Shown is a side view of the present invention 10 being a refuse or recycling pail for cans, bottles or paper, that includes a light weight body 12 with integrally formed bottom 14 and side wall 16, wherein the upper end of the side wall around the periphery thereof defines a mouth 18 for receiving refuse or recycling items and for receiving and supporting a lid. The present invention 10 also has an upper disposed handle 26 for easy manipulation of the pail, base apertures for drainage (not shown), interiorly positioned indicia (not shown) indicating sections for recyclables and a reflective element 28 encompassing a portion of the outer periphery of the pail having address blocks 30 for owner identification.

Figure 5:
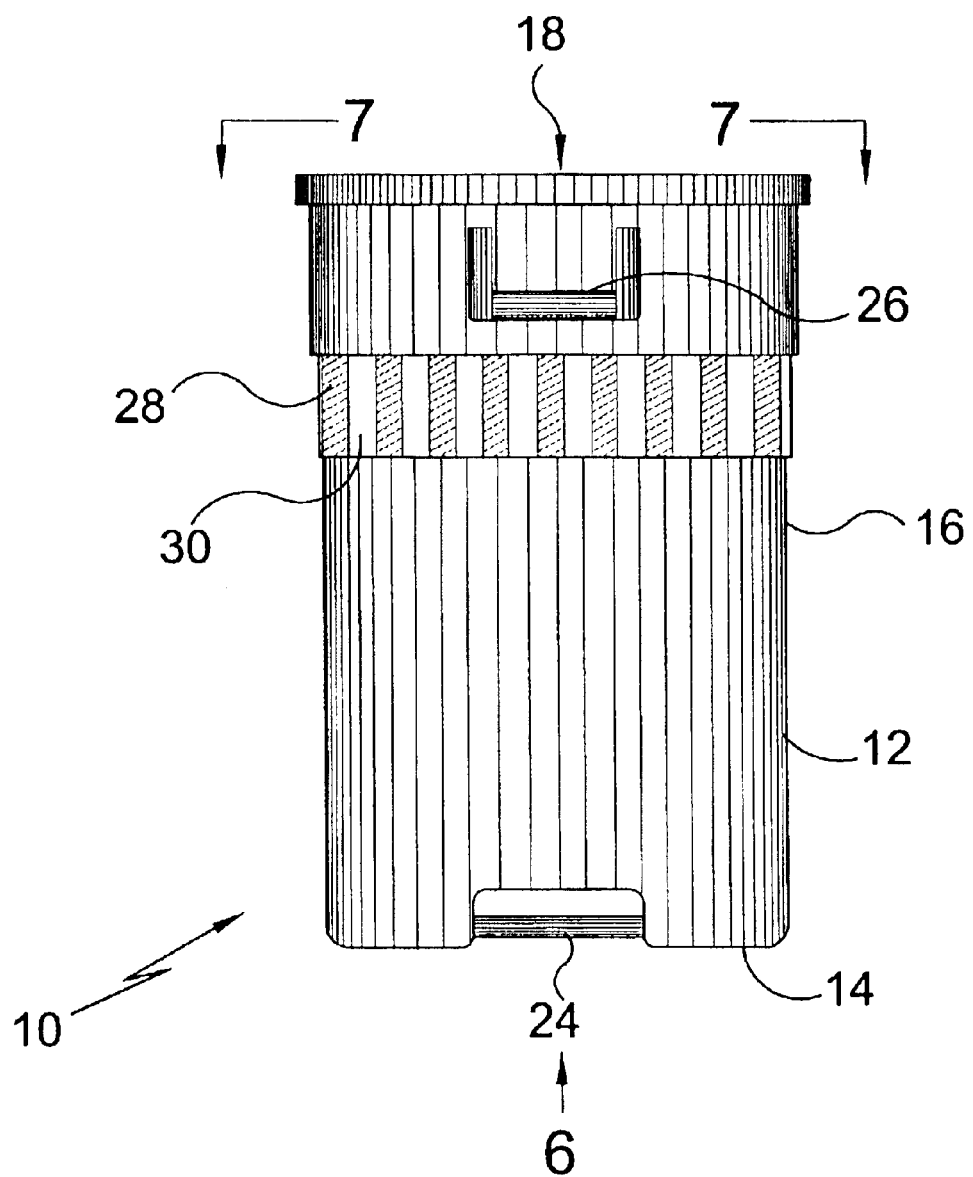
FIG. 5 is a side view of the present invention.

Turning to FIG. 5, shown therein is a side view of the present invention 10. Shown is a side view of the present invention 10 being a refuse or recycling pail for cans, bottles or paper, that includes a light weight body 12 with integrally formed bottom 14 and side wall 16 wherein the upper end of the side wall around the periphery thereof defines a mouth or opening 18 for receiving refuse or recycling items and for receiving and supporting a lid. Also shown are a plurality of base 24 and upper 26 disposed handles for easy manipulation of the pail, base apertures for drainage (not shown), interiorly positioned indicia (not shown) indicating sections for recyclables and a reflective element 28 encompassing a portion of the outer periphery of the pail having address blocks 30 for owner identification.

Figure 6:
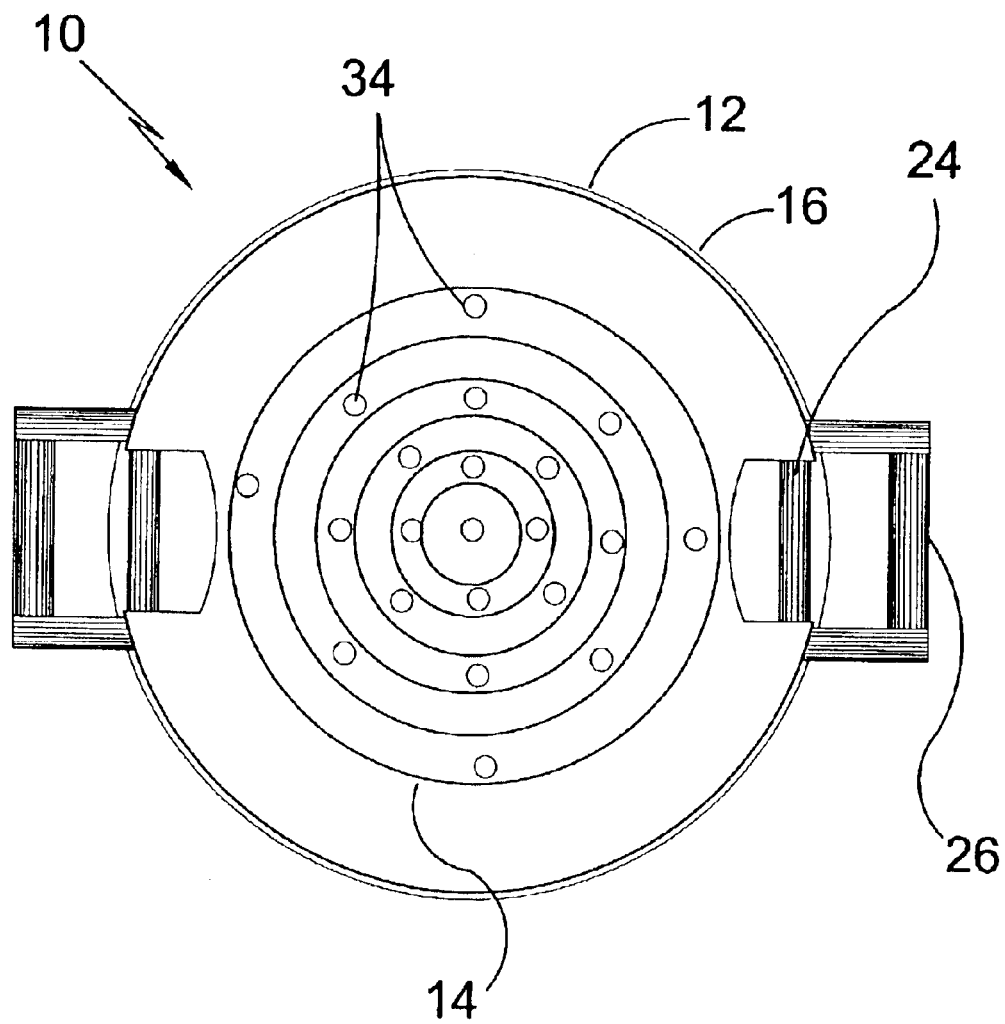
FIG. 6 is a bottom view of the present invention.

Turning to FIG. 6, shown therein is a bottom view of the present invention 10. Shown is a bottom view of the present invention 10 being a refuse or recycling pail for cans, bottles or paper, that includes a light weight body 12 with integrally formed bottom 14 and side walls 16 having a plurality of base 24 and upper 26 disposed handles for easy manipulation of the pail, a plurality of base apertures 34 for drainage and interiorly positioned indicia (not shown) indicating sections for recyclables.

Figure 7:
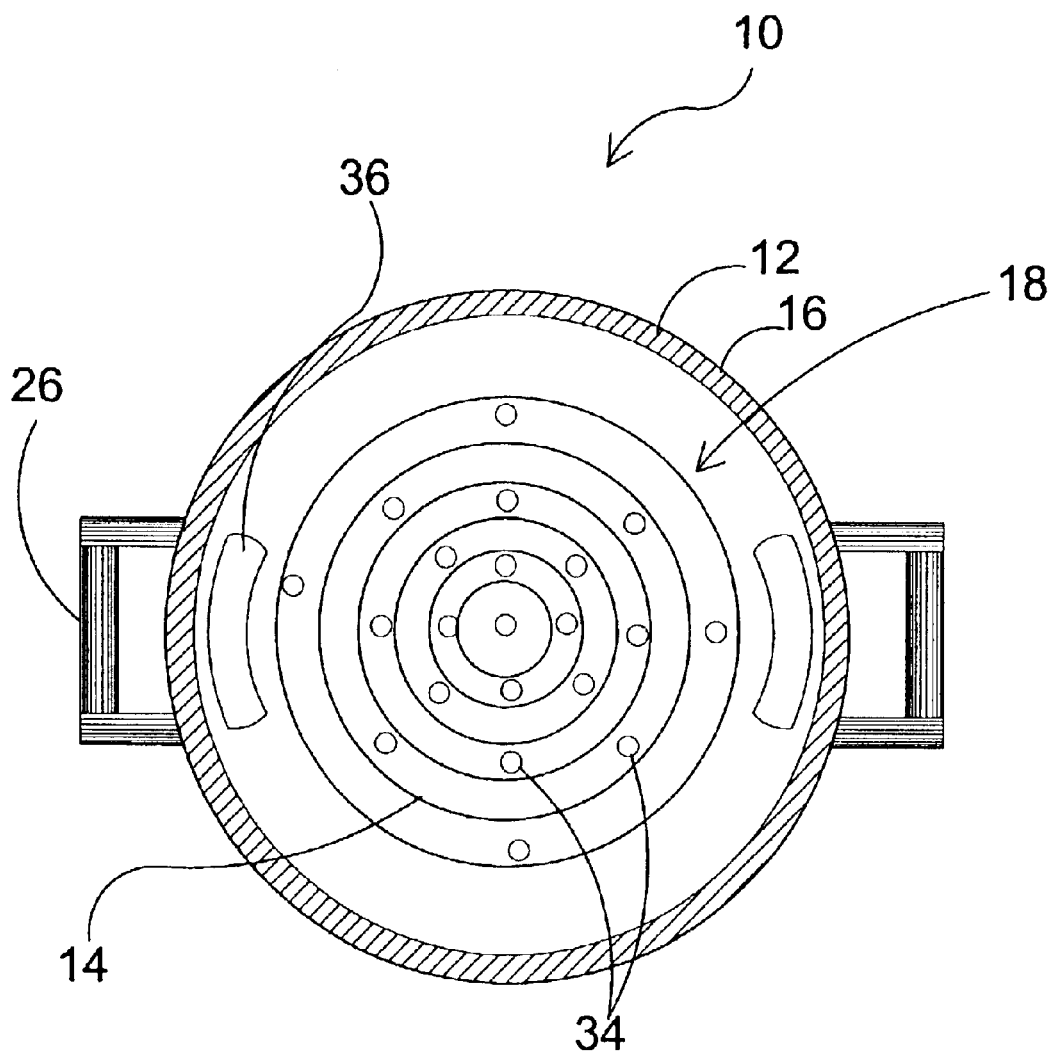
FIG. 7 is a top view of the present invention.

Turning to FIG. 7, shown therein is a top view of the present invention 10. Shown is a top view of the present invention 10 being a refuse or recycling pail for cans, bottles or paper, that includes a light weight body 12 with an integrally formed base or bottom 14 and side wall 16, wherein the upper end of the side wall 16 around the periphery thereof defines a mouth 18 for receiving refuse or recycling items and for receiving and supporting a lid. Also shown are a plurality of upper 26 disposed handles for easy manipulation of the pail, a plurality of base apertures 34 for drainage, interiorly positioned indicia (not shown) indicating sections for recyclables and a reflective element (not shown) encompassing a portion of the outer periphery of the pail having address blocks (not shown) for owner identification. A plurality of housings or indentions 36 for the bottom handles are also shown.

Figure 8:
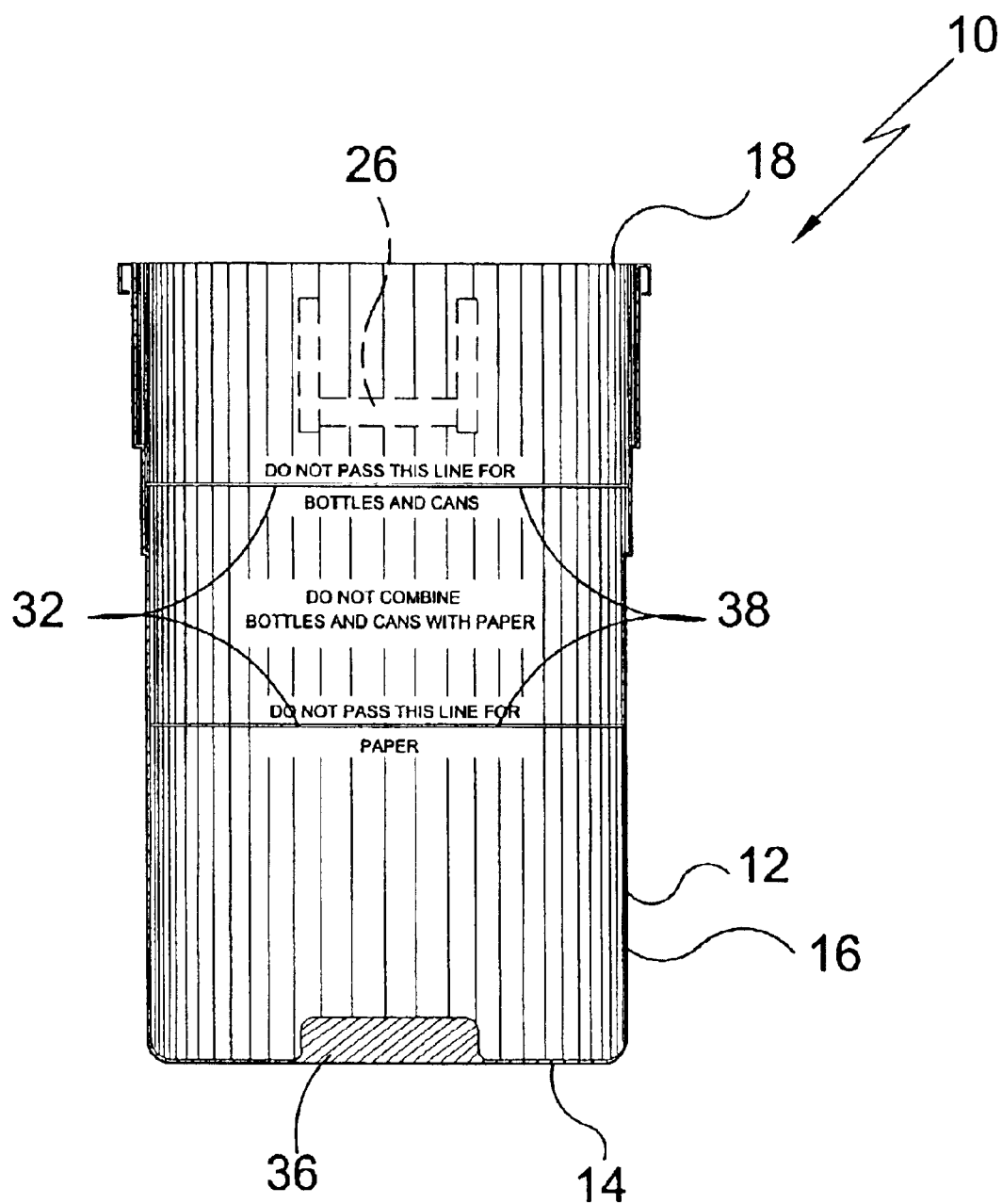
FIG. 8 is a sectional view of the present invention.

Turning to FIG. 8, shown therein is a sectional view of the present invention 10. Shown is a sectional view of the present invention 10 being a refuse or recycling pail for cans, bottles or paper, that includes a light weight body 12 with integrally formed bottom 14 and side wall 16 wherein the upper end of the side wall around the periphery thereof defines a mouth 18 for receiving refuse or recycling items and for receiving and supporting a lid. Also shown are a plurality of upper 26 disposed handles for easy manipulation of the pail, base apertures for drainage (not shown), interiorly positioned indicia 32 indicating sections using lines 38 for recyclables and a reflective element (not shown) encompassing a portion of the outer periphery of the pail having address blocks (not shown) for owner identification. A housing or indention 36 for the bottom handles is also shown.

Figure 9:
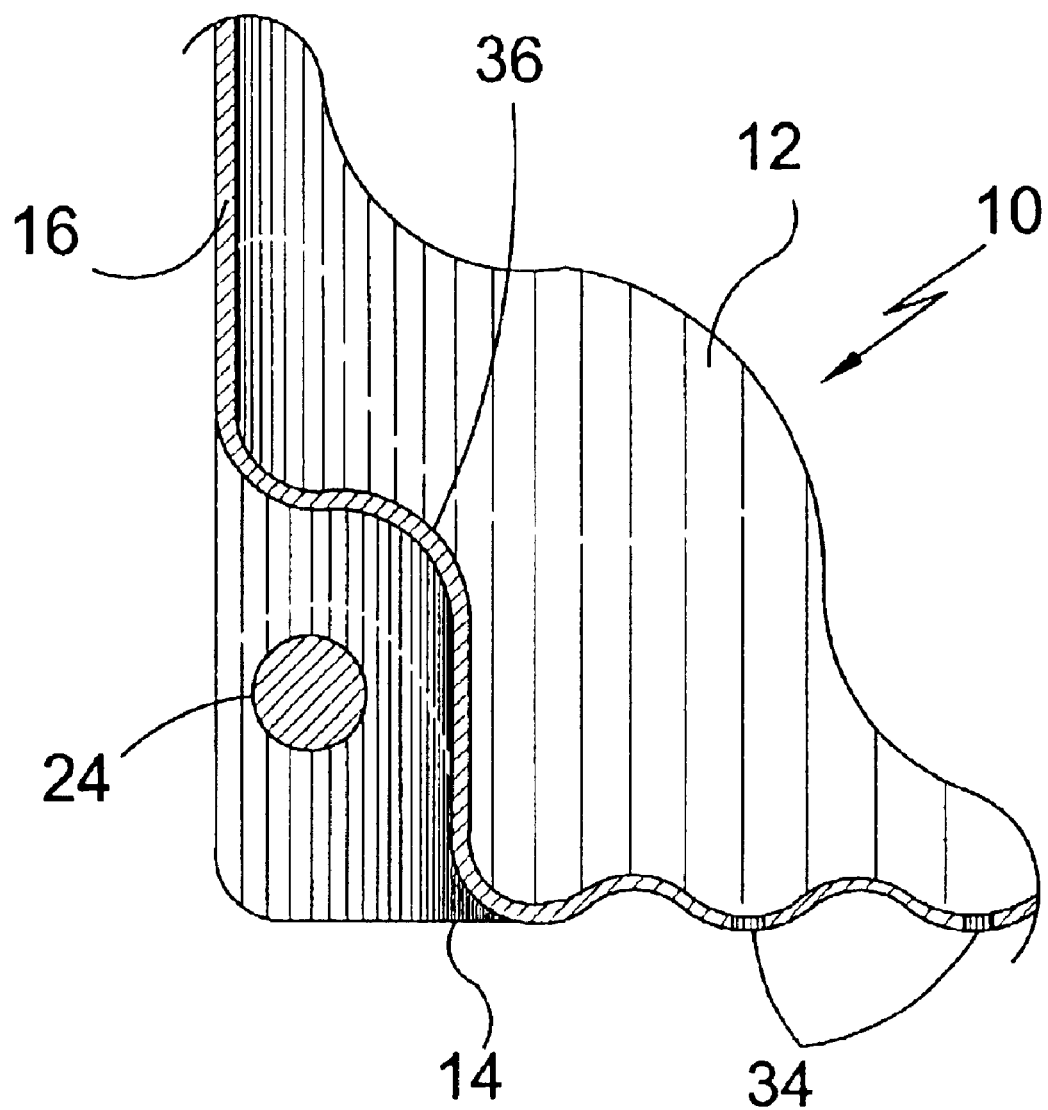
FIG. 9 is a sectional view of the present invention.

Turning to FIG. 9, shown therein is a sectional view of the lower handle 24 of the present invention 10. Shown is a sectional view of the lower handle 24 of the present invention 10 being a refuse or recycling pail for cans, bottles or paper, that includes a light weight body 12 with integrally formed bottom 14 and side walls 16 having a plurality of base disposed handles 24 for easy manipulation of the pail, also having base apertures 34 for drainage. A housing 36 for the bottom handles is also shown.

Figure 10:
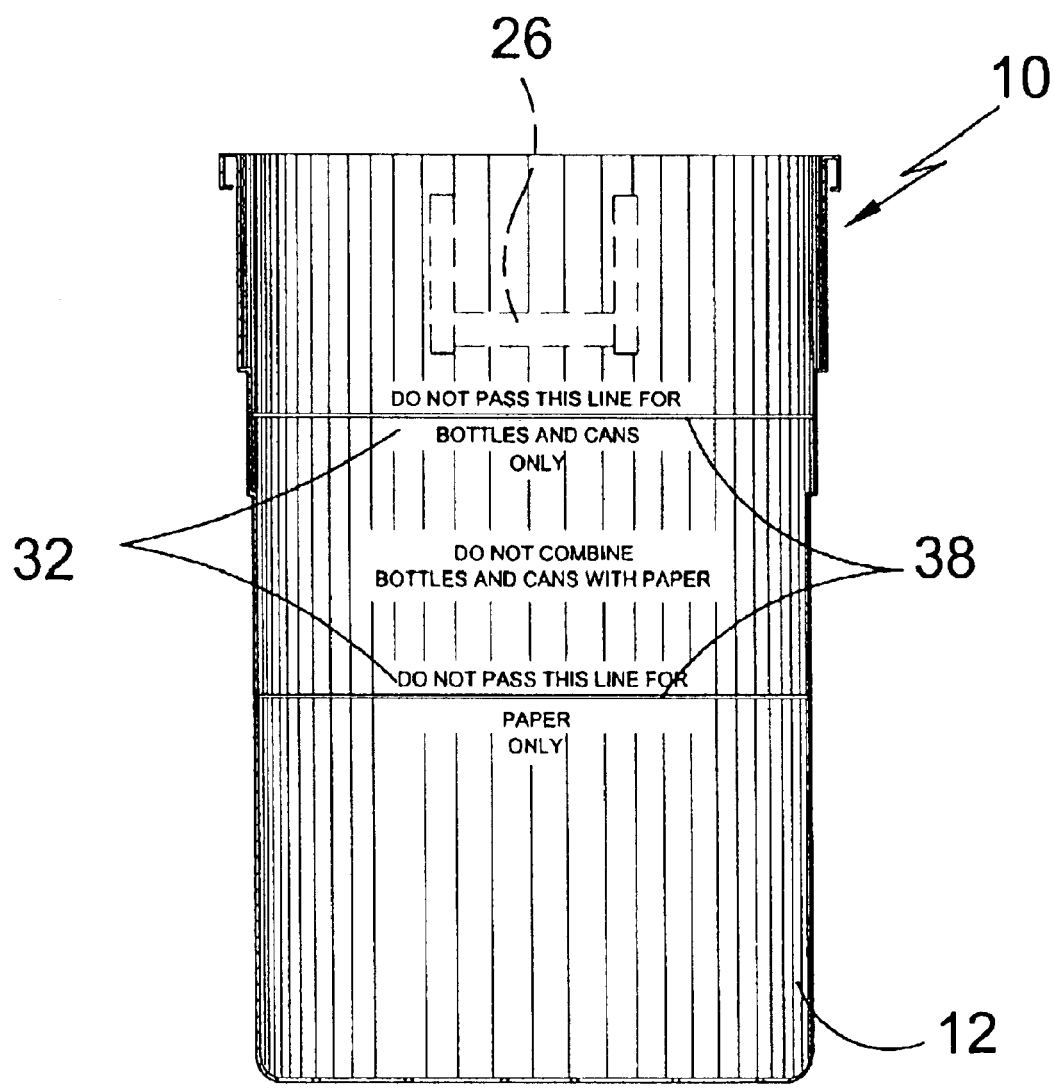
FIG. 10 is an illustrative view of the present invention.

Turning to FIG. 10, shown therein is an illustrative view of the present invention 10. Shown is a view of the pail 12 of the present invention 10. The pail 12 may be used either for refuse or recycling items not in conjunction with one another. When used for recycling, indicia 32 are included for the convenience of the user and whoever has to pick it up. One indicia line 38 indicates that paper should not exceed about one-third of the containers' capacity and should not be mixed with bottles and cans. A second indicia line 38 indicates that bottles and cans should not exceed about two-thirds of the capacity of the container 12. Upper handle 26 is also shown.

I claim:

1. A refuse pail, comprising:
   a) a cylindrical container having an upper end and a bottom end, a bottom, and a side wall having inner and outer surfaces, said upper end of said container having an opening therein;
   b) a lid for covering said opening, said lid having a top side, wherein a handle is disposed on said top side of said lid;
   c) at least one upper handle disposed on said upper end of said side wall of said container to permit a user to grasp the refuse pail;
   d) at least one bottom handle disposed on said bottom end of said side wall of said container to permit a user to grasp the refuse pail;
   e) means for a plurality of reflective elements disposed on said upper end of said outer surface of said side wall whereby the container can be more easily seen by an approaching user; and,
   f) means for a plurality of identification blocks disposed on said upper end of said outer surface of said side wall whereby the identity of the owner of the refuse pail can be placed thereon.

2. The refuse pail of claim 1, wherein said bottom has a plurality of apertures therein to permit liquid to drain from inside the refuse pain.

3. The refuse pail of claim 2, further comprising a first indicia line disposed on said inner surface of said side wall about one-third the distance from said bottom end to said upper end to permit a user to determine when the refuse pail is about one-third full, said first indicia line being disposed in substantially the horizontal plane.

4. The refuse pail of claim 3, further comprising a second indicia line disposed on said inner surface of said side wall about two-thirds the distance from said bottom end to said upper end to permit a user to determine when the refuse pail is about two-thirds full, said second indicia line being disposed in substantially the horizontal plane.

5. The refuse pail of claim 4, further comprising a first set of indicia disposed adjacent said first indicia line indicating that paper should not be placed above said first indicia line.

6. The refuse pail of claim 5, further comprising a second set of indicia adjacent said second indicia line indicating that bottles and cans should not be placed above said second indicia line.

7. The refuse pail of claim 1, wherein said means for a plurality of identification blocks comprises a plurality of identification blocks disposed in said blank spaces around said refuse pail to permit the identity of the owner to be placed in the blocks.

8. The refuse pail of claim 1, wherein said bottom handle is disposed in an indention in said bottom end of said side wall, said indention for receiving a hand of a user to permit a user to easily grip the bottom handle of the refuse pail.

* * * * *